C. H. FOSTER.
SHOCK ABSORBING DEVICE FOR VEHICLES.
APPLICATION FILED JAN. 21, 1907.
918,987.
Patented Apr. 20, 1909.
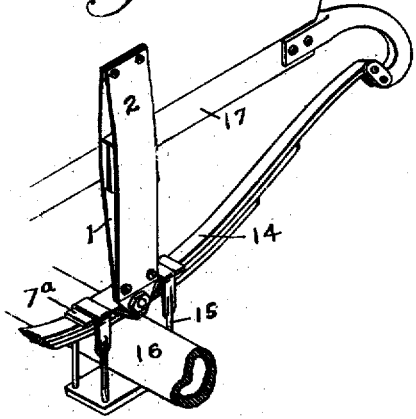
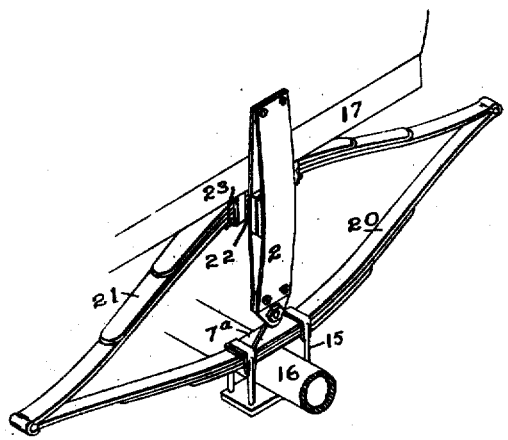
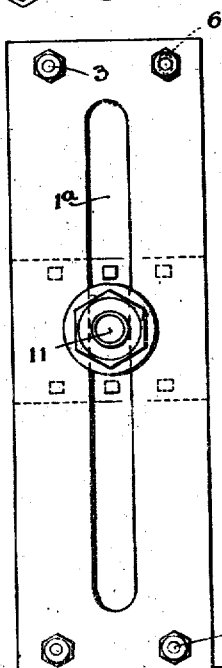
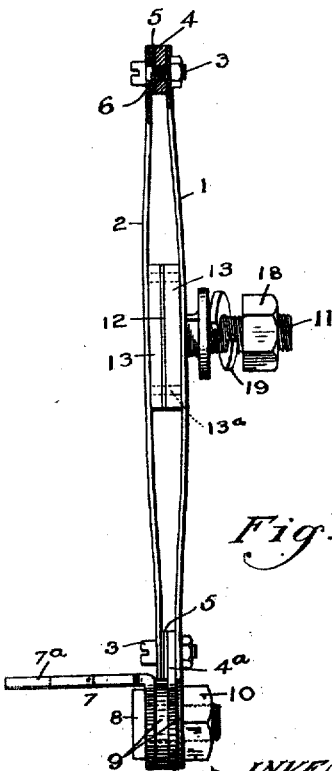
WITNESSES:
INVENTOR,
Claud H. Foster
BY Bates, Foster & Hull
ATTYS

UNITED STATES PATENT OFFICE.

CLAUD H. FOSTER, OF CLEVELAND, OHIO.

SHOCK-ABSORBING DEVICE FOR VEHICLES.

No. 918,987.   Specification of Letters Patent.   Patented April 20, 1909.

Application filed January 21, 1907. Serial No. 353,210.

*To all whom it may concern:*

Be it known that I, CLAUD H. FOSTER, a citizen of the United States, residing at Cleveland, in the county of Cuyahoga and State of Ohio, have invented a certain new and useful Improvement in Shock-Absorbing Devices for Vehicles, of which the following is a full, clear, and exact description, reference being had to the accompanying drawings.

This invention relates to devices for absorbing shocks given to vehicles and for reducing the extent of vibration between the axles and bodies of the same, for the purpose of preventing injury to the springs and overcoming unpleasant and injurious vibrations of the vehicle body.

It has for its object the production of a device of this kind which is extremely simple in construction and effective in operation; which may be readily adjusted to compensate for the wear of the parts; which may be easily assembled, quickly applied to and removed from the vehicle, and which is withal cheap of construction.

Generally speaking, the invention may be defined as consisting of the combinations of elements embodied in the claims hereto annexed.

In the drawings, Figure 1 represents a front elevation of a device constructed in accordance with my invention. Fig. 2 illustrates a side elevation thereof, partly in section. Fig. 3 is a perspective view showing one manner of applying my device to a vehicle, and Fig. 4 is a similar view representing my device applied to a vehicle equipped with a full elliptic spring.

The device consists of a pair of more or less flexible metallic plates 1 and 2, which plates are secured together at their ends by means of bolts 3 extending through the end portions of the plates and through spacers interposed therebetween. The spacing means herein shown consists of spacing plates 4, 4$^a$, which may be riveted or otherwise suitably secured to the plate 1. These spacing plates are of less thickness than that ordinarily required between the ends of the plates, and, to increase the distance between the plates 1 and 2 to the required width, two or more washers or shims 5 may be inserted between the plates 4, 4$^a$, and the adjacent ends of plate 2. The slots 6 in plate 2, through which the bolts 3 extend are elongated, for a purpose to be hereinafter described. Spacing plates 4, 4$^a$, as well as plate 1, are threaded for the reception of the bolts 3, whereby the ordinary nut of the bolt serves as a lock nut to prevent the unscrewing of the bolts. The plate 4$^a$ is extended below plates 1 and 2 and may have its lower end reduced or narrowed to form a generally triangular extension 4$^b$. To this extension there is pivotally secured an angle iron clip 7, by means of a bolt 8 which extends through the vertical flange of said clip, through 4$^b$ and through suitable washers 9, the bolt being provided with a nut 10. The horizontal flange 7$^a$ of the angle plate is provided with a central hole for the reception of the corresponding bolt head on the spring, and the length of such flange is sufficient to permit the clips by which the spring is secured to the axle to pass over the flange, forming a secure attachment between the said flange and the spring.

The plate 1 is provided with a longitudinal slot 1$^a$, through which extends a stud 11, the inner end of which is connected in any suitable manner with the metallic plate 12 having on each side thereof a leather or raw-hide facing or plate 13. These facings may be secured to plate 12 as by studs or rivets 13$^a$. The plate 12 and facings 13 are of greater thickness than the normal width of the space between the plates 1 and 2, whereby the plates must be spread apart by the slide and produce frictional engagement between the facings 13 and the plates 1 and 2. It will be apparent that, when the friction device consisting of plate 12 and facings 13 occupies the longitudinal central portion of the space between the plates 1 and 2, the friction between said plates and the facings 13 is at a minimum. It will be further apparent that, as said friction device is moved away from the center toward either of the ends of the plates 1 and 2, there will be an increasing frictional engagement between the same and said plates, the friction increasing with the increase of the distance from the center. As the leather or raw-hide facings wear, a washer or shim 5 may be removed from between the ends of the plates, and the bolts 3 may again be tightened, thus preventing an undue decrease in the friction between said facings and the plates 1 and 2 as the said facings wear away. If desirable, the amount of friction which is exerted between the friction device and the plates 1 and 2 may be made greater toward one end of the longitudinal plates than toward the other. This can be accomplished by making the space between one end of the plates greater than the space between the other end thereof.

In Fig. 3, my device is shown as applied to a vehicle having a half spring thereon, as a semi-elliptic spring. In this case, flange 7ª is operatively connected to the axle by being secured to the spring 14 through the clips 15 which secure the spring to the axle 16. In applying my device to a vehicle having a half spring, it will only be necessary, in addition to clipping the flange 7ª to the spring, to bore a hole in the vertical flange 17 of the angle bar usually provided for the body frame and to insert the stud 11 therethrough. By means of the nut 18 and spring washer 19, the stud may be firmly secured to said flange. It will be understood, of course, that the proportions of parts in my device are such that, when applied to a vehicle having a half or semi-elliptic spring, the friction device will be normally about half way between the ends of the plates when the stud is secured to the flange 17.

In Fig. 4, I have shown the manner of applying my device to a vehicle having a complete or full elliptic spring. In this case, the flange 7ª is operatively connected to the axle by being secured to the lower part of the spring 20 in the same manner as it is applied to the spring 14. The upper half 21 of the spring 20 will be provided with an angle iron clip 22, similar to clip 7, one flange 23 of which will be secured to the upper half of the spring by clips in the same manner as flange 7ª is secured to the lower half of the spring. The friction device will be operatively connected with the body or frame by securing the stud 11 to the vertical flange of the clip 23 in the same manner as the stud in Fig. 3 is connected to the flange 17 of the frame. The proportions of parts in my device when used with a complete or full elliptic spring will be such that, under normal conditions of load, the friction device will generally occupy the longitudinal central portion of the space between the plates 1 and 2, which is normally the point of least friction.

The clip 7 is reversible, enabling it to be applied to either side of the plate 4ª, thus accommodating the device equally well for application to a spring which is located within the vertical plane of the frame of a vehicle or to a spring which is located outside the vertical plane of the frame. The employment of the bolt 8 and washers 9 as a means of connecting the clip 7 with the plate 4ª permits of sufficient rotary movement of the clip with reference to the device to allow and compensate for the endwise movement of the body of the vehicle. At the same time, the provision of the elongated slot 6 in the plate 2 renders the device flexible and permits it to yield to side swaying of the body without injury to said device. In normal operation and under normal conditions, my device offers a minimum resistance to the vibrations of the spring when the plate 12 and facings 13 are at or near the center of the longitudinal plates, with an increasing resistance as the parts 12 and 13 move from the center toward either end of the longitudinal plates 1 and 2, according as the spring is deflected under a load or shock, and is bowed or arched under rebound.

Having thus described my invention, I claim:

1. The combination, with the axle and frame of a vehicle, of a pair of vertically extending spaced plates, means for connecting said plates to one of the aforesaid vehicle members, a friction device interposed between said plates and operatively connected with the other vehicle member, the thickness of said device being greater than the normal width of the space between said plates, and means whereby the space between said plates may be diminished to compensate for the wear of said friction device, substantially as specified.

2. The combination, with the axle and frame of a vehicle, of a pair of vertically extending plates pivotally connected to one of the aforesaid vehicle members, a friction device interposed between said plates and occupying a position intermediate between the ends of the plates and operatively connected to the other vehicle member and being of greater thickness than the normal width of the space between said plates, one of said plates being flexibly secured to the other to accommodate side-swaying of the vehicle body, substantially as specified.

3. The combination, with the axle and frame of a vehicle, of a pair of flexible, longitudinal plates connected together adjacent to their ends and operatively connected with one of the aforesaid vehicle members, a friction device interposed between said plates in the space between the points of connection and being of greater thickness than the normal width of said space and being operatively connected with the other vehicle member, and means connecting said plates to permit relative longitudinal movement thereof, substantially as specified.

4. The combination, with the axle and frame of a vehicle, of a pair of vertically extending flexible plates operatively connected with one of the aforesaid vehicle members and connected together at their ends, a friction device interposed between said plates, normally occupying the longitudinal central portion of the space therebetween and operatively connected with the other of said members, said device comprising a metallic plate or backing and one or more facing pieces or plates therefor of leather or similar material adapted to engage the inner faces of said vertically extending plates, the thickness of said device being greater than the normal width of the space between said vertically extending plates, substantially as specified.

5. The combination, with the axle and frame of a vehicle, of a pair of spaced plates connected together adjacent to their ends, means for connecting said plates to one of the aforesaid vehicle members, a friction device in the space between the connected portions of said plates and operatively connected with the other vehicle member, the thickness of said device being greater than the normal width of the space between said plates, and means whereby the space between said plates may be diminished to accommodate and compensate for the wear of said friction device, substantially as specified.

6. The combination with a vehicle axle and frame, of a pair of longitudinal plates spaced apart and having removable washers or shims interposed between the ends thereof, and a friction device slidably mounted between said plates and operatively connected with the other of said vehicle members, substantially as specified.

7. The combination, with the axle and frame of a vehicle, of a pair of plates having their ends connected, a flange pivotally secured to one end of said plates, means for securing said flange to one of the aforesaid vehicle members, a friction device interposed between said plates, and means for connecting said device to the other of said vehicle members, the plates being arranged to permit of relative movement therebetween to accommodate side-swaying of the vehicle body, substantially as specified.

8. The combination, with the axle and frame of a vehicle, of a spring on said axle, a pair of plates having pivotally secured at one end thereof a flange adapted to be secured to the spring, a friction device interposed between said plates and slidably engaging the same, and a stud projecting from said device and operatively connected with the other vehicle member, substantially as specified.

9. The combination, with the axle and frame of a vehicle, of a pair of plates pivotally connected to one of the aforesaid vehicle members, a friction device interposed between said plates and operatively connected to the other vehicle member and being of greater thickness than the normal width of the space between said plates, one of said plates being flexibly secured to the other to accommodate side swaying of the vehicle body, substantially as specified.

10. A device for the purpose specified comprising a pair of plates, one or more bolts extending through the ends of the said plates, one of said plates having an elongated slot or slots for said bolt or bolts, said plates being provided with means whereby they may be pivotally connected with a vehicle member, and a friction device interposed between said plates and having means whereby it may be connected to a vehicle member, substantially as specified.

11. A device for the purpose specified, comprising a pair of plates having their ends connected and their intermediate portions spaced apart, a flange pivotally secured adjacent to one end of said plates, and a friction device interposed between said plates, the connecting means for the ends of the plates permitting relative longitudinal movement therebetween, substantially as specified.

12. A device for the purpose specified comprising a pair of plates spaced apart, one of said plates having a slot therein, a flange pivotally secured to said plates, and a friction device interposed between said plates and having a stud projecting through said slot, substantially as specified.

13. A device for the purpose specified comprising a pair of plates spaced apart, one of said plates having a slot therein, a flange pivotally secured to one end of said plates, and a friction device interposed between said plates and having a stud projecting through said slot, and means connecting said plates to permit relative longitudinal movement therebetween, substantially as specified.

14. A device for the purpose specified comprising a pair of plates having spacing means interposed between the ends thereof, bolts extending through said ends and the spacing means, one of said plates having elongated slots for said bolts, an extension projecting from one end of said plates, a flange pivotally secured thereto, a friction device interposed between said plates, and a stud projecting therefrom, substantially as specified.

15. The combination, with a vehicle axle and frame, of a pair of members spaced apart and having removable washers or shims interposed therebetween, and a friction device slidably mounted between the spaced members and operatively connected with the other of said vehicle members, substantially as specified.

16. The combination, with the axle and frame of a vehicle, of a pair of spaced members, means for connecting said members to one of the aforesaid vehicle members, a friction device interposed between said spaced members and operatively connected with the other vehicle member, the thickness of said device being greater than the normal width of the space between said spaced members, and means whereby the space between the spaced members may be diminished to accommodate and compensate for the wear of said friction device, substantially as specified.

17. The combination, with the axle and frame of a vehicle, of a pair of flexible spaced plates connected with one of the aforesaid vehicle members, a friction device operatively connected with the other vehicle member and engaging opposite portions of said plates intermediate between the ends thereof, and means whereby the space between said plates may be varied to accommodate the wear of said friction device.

18. The combination, with the axle and frame of a vehicle, of a pair of flexible spaced plates connected with one of the aforesaid vehicle members, a friction device operatively connected with the other vehicle member and engaging opposite portions of said plates intermediate between the ends thereof, and means for connecting the ends of said plates, said means permitting relative longitudinal movement between said plates.

19. The combination, with the axle and frame of a vehicle, of a pair of flexible spaced plates connected with one of the aforesaid vehicle members, a friction device operatively connected with the other vehicle member and engaging opposite portions of said plates intermediate between the ends thereof, and one or more bolts extending through the end of said plates, one of said plates having an elongated slot or slots for said bolt or bolts.

20. The combination, with the frame and axle members of a vehicle, of a pair of flexible plates connected together and to one of said vehicle members, and a friction slide connected to the other member and being of greater thickness than the normal width of the space between the points at which said plates are connected, said space forming a smooth, unbroken path for said slide, substantially as specified.

In testimony whereof, I hereunto affix my signature in the presence of two witnesses.

CLAUD H. FOSTER.

Witnesses:
IDA DUNHAM,
NATHAN F. FRETTEN.